July 3, 1928.
J. A. HEANY
ELECTRIC TRANSMISSION
Original Filed Dec. 1, 1919    2 Sheets-Sheet 1
1,676,028
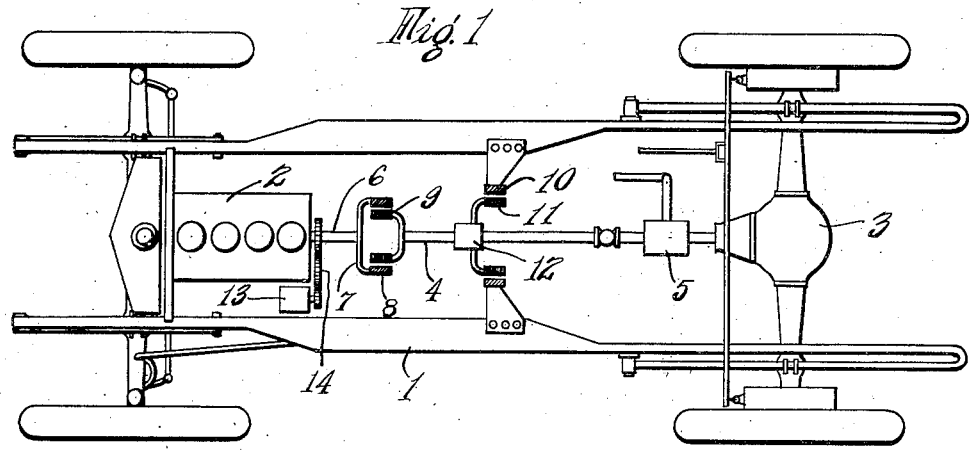
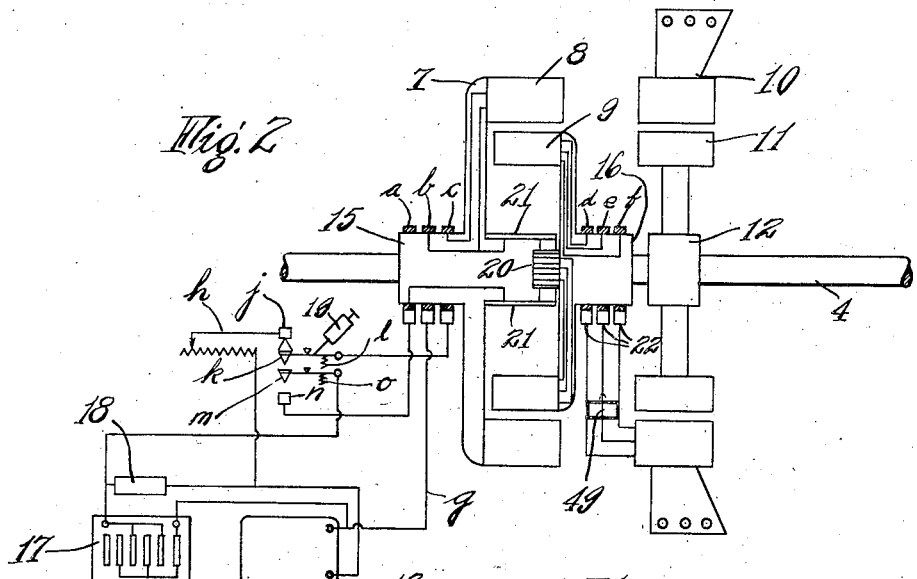
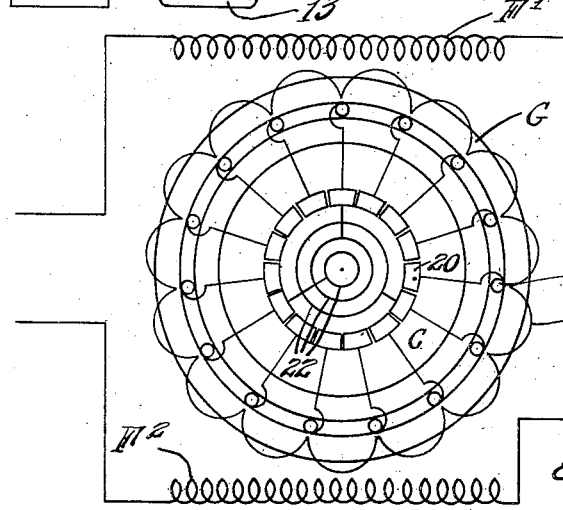
INVENTOR
JOHN ALLEN HEANY.
BY
Edward C. Saenett
ATTORNEY July 3, 1928.
J. A. HEANY
1,676,028
ELECTRIC TRANSMISSION
Original Filed Dec. 1, 1919   2 Sheets-Sheet 2
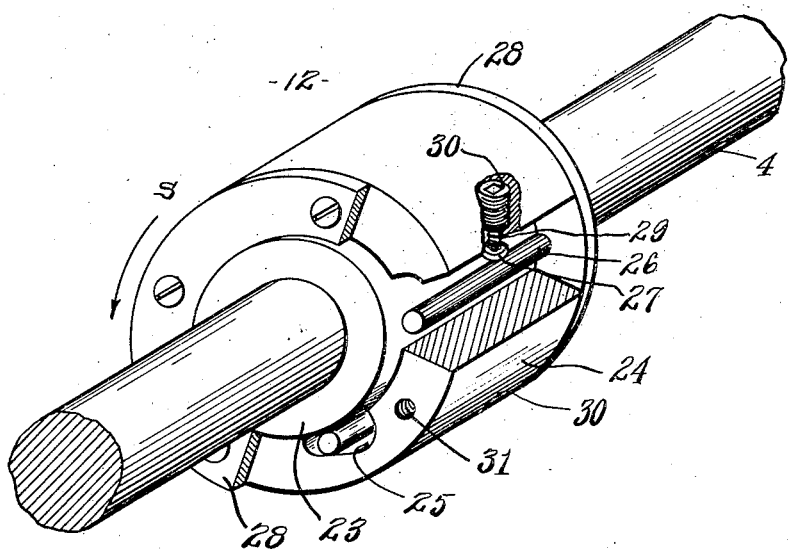
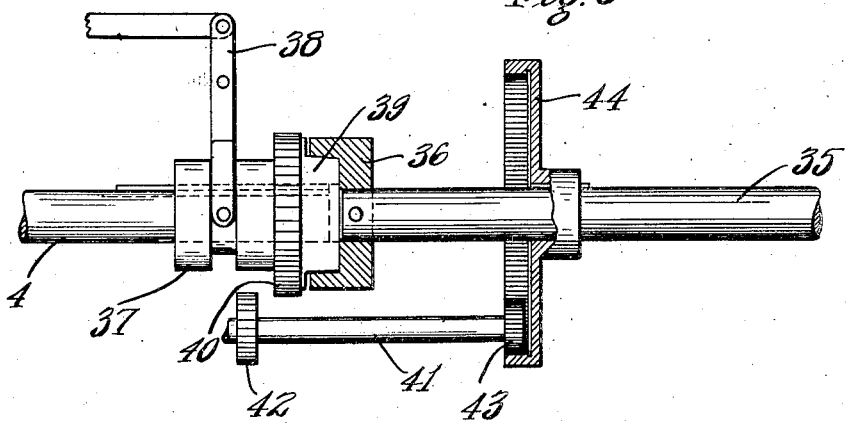
INVENTOR
John Allen Heany
BY
Edward C. Jarnett.
ATTORNEY Patented July 3, 1928.

1,676,028

UNITED STATES PATENT OFFICE.

JOHN ALLEN HEANY, OF NEW HAVEN, CONNECTICUT, ASSIGNOR TO HEANY LABORATORIES, INC., OF NEW HAVEN, CONNECTICUT, A CORPORATION OF CONNECTICUT.

ELECTRIC TRANSMISSION.

Application filed December 1, 1919, Serial No. 341,710. Renewed December 6, 1926.

This invention relates to power-transmitting devices, and more especially to electric transmissions of the multiple-unit type wherein two or more dynamo-electric machines are utilized to transmit power from a prime mover or driving member to a driven member. In transmissions of this type one of the dynamo-electric machines acts a clutch member, the field member being mechanically connected to either the drive member or the driven member and the armature to the other member. The relative rotation or slip of the two members of the clutch unit when under load develops in the winding of the armature member thereof electrical energy, the current of which flowing in the armature conductors reacts with the magnetic field to produce torque applied to the armature member carried by the driven shaft and the developed electrical energy is converted by the second or other units into torque applied also to the driven shaft. This electrical energy is large or small according to the relative difference in the rate of speed of the two members of the first unit. When the difference in the rotative speed of the two members of the first unit is less than a certain amount, dependent upon the conditions of operation and the structure of the two units, the mechanical force or torque developed in the rotor of the second unit by the above-referred-to electrical energy is insufficient to assist in rotating the driven shaft. At such times the torque of the system tends to decrease to zero unless some other means of absorbing the slip energy of the first unit is provided, such, for example, as an auxiliary short-circuited winding on the armature of the generator. It has heretofore been the practice, when the above-described condition existed, to electrically disconnect the units and short circuit the armature winding by a manually-operated means. Such an arrangement is unsatisfactory inasmuch as it makes the control of the transmission complex and leaves the regulation thereof to the attention of the operator who must determine from the operation of the transmission when the units should be electrically connected and disconnected.

It is the object of this invention to provide an electric transmission of this type, in which the various units are at all times during the operation thereof electrically connected, and in which the rotor of the second unit is mechanically engaged with the driven shaft at such times as the electrical energy generated in the first unit develops in the rotor of the second unit sufficient torque to assist in rotating the driven shaft, and automatically disengaged at other times.

An additional object of the invention is the construction of the first unit whereby it may be utilized to impart to the prime mover its initial movement.

Other objects, features and advantages will become apparent as the description proceeds.

The invention consists, in the main, of a clutch element, comprising a dynamo-electric machine having a field frame and armature frame, both mounted for rotation, one being secured to the drive shaft or the prime mover and the other to the driven shaft of the system. If desired, the clutch element may be connected to the drive shaft through gearing, chain drive and the like, whereby the ratio of the rotative speeds of the drive shaft and the element of the clutch connected therewith can be varied.

The fields of the clutch element may be furnished with current for their excitation from an auxiliary direct-current generator operated by the drive shaft or the prime mover, or such current taken from the clutch element itself may be rectified and utilized for such excitation. The source of exciting current also supplies current for the purpose of charging a storage battery which is prevented from discharging through the windings of the generator by the inclusion in the circuit of a battery control having asymmetric conductivity. The storage battery is designed to furnish current for ignition, lighting and other purposes when the system is used on an automobile, and also furnishes current to the clutch element at such times as it is desired that the clutch element act to impart the initial motion to the prime mover. For this purpose the armature of the clutch element is provided with a commutator connected to some of its windings, and the field frame carries cooperating brushes so that the clutch element is adapted to act as a direct current motor. In its normal capacity the clutch element usually functions as a dynamo-electric machine of the alternating type. The armature of the clutch element has a closed-circuit, low-resistance winding of the squirrel-cage induction type and a second or additional polyphase winding connected to commutator bars, and, at intervals, to slip rings whereby the electrical energy generated in the additional winding is conducted to the second unit or motor. The squirrel-cage winding is provided to absorb the slip energy of the first unit when the motor approaches synchronism and at all higher speeds. Other suitable means may be provided to assume the functions of the squirrel-cage winding. For example, the generator may be wound with only the polyphase winding, as described, and a variable polyphase impedance may be shunted across the motor primary leads. This impedance can be varied at will or it may be so constructed that it will vary automatically with the frequency by utilizing its inherently-varying reactance or by "skin effect." The excitation current is conducted to the fields of the clutch unit through a variable resistance element and in automobile systems this resistance may be connected with the accelerator lever so that as the latter is operated to accelerate the engine, resistance is simultaneously reduced in the field circuit, thus simultaneously and automatically increasing the field strength, to increase the torque produced upon the driven element through the clutch element of the transmission.

The field resistance, however, may be controlled independently of the prime mover, and the latter can also be run then at a constant speed, if desired, and the variation of the torque and speed of the driven element controlled by varying the resistance in the field circuit. In operation, the rotation, by the prime mover or driven shaft, of one element of the clutch unit relative to the other, when carrying torque, generates in the armature member of the clutch unit electrical energy, a portion of which reacts with the field member of the clutch unit to cause rotation of the other element and with it the driven shaft. The remaining electrical energy is conducted through slip rings to the primary of an induction motor, or it is rectified through a commutator and conducted to a direct-current motor, the induction or direct-current motor comprising a second element of the transmission system. For reasons based on the above statement, the clutch unit may be aptly termed the "generator", and because of the fact that both its elements are mounted for rotation, it may be termed a "differential speed generator."

One element of the motor, namely, the stator, is secured to the frame of the car and the other element or rotor is so mounted on the driven shaft that if its speed of rotation equals, or tends to exceed, that of the shaft, it becomes locked to the shaft and adds its torque to that imparted to the shaft through the clutch element or generator. When the nature of the electrical energy supplied to the motor is insufficient to rotate the rotor at any speed less than that of the shaft, or is insufficient to rotate it at all, the locking connection between the rotor and the shaft is automatically broken and the rotor "floats" on the shaft. For that reason I term the rotor a "floating rotor." The floating rotor may be connected to the driven shaft by means of an overrunning roller clutch, a shifting cone clutch, a simple pawl and ratchet, or by any other suitable means. Although I have described and shown the floating rotor as mounted on and concentric with the shaft, it may, if desired, be connected thereto by a chain, belt, or by gears, by means of which the speed ratio may be varied between the shaft and the motor when the latter is producing torque. Obviously the effect of the floating rotor can be gained by installing the overrunning clutch or its equivalent device in any suitable or convenient point in the system connecting the shaft and the rotor.

Either the stator or the rotor of the motor may be wound and connected as the primary thereof, the other element being the secondary.

A plurality of motors may be used if desired, utilizing the slip energy of the generator, or one motor may be connected to utilize the slip energy of another as in the case of concatenated motors.

Furthermore, although I will disclose the use of alternating current in the description of the embodiment of my invention, certain features, such, for example, as the floating rotor, are obviously equally applicable to a direct-current system, and I do not wish it to be inferred that such features are limited to alternating-current systems.

In an alternating-current system I provide the armature of the clutch unit with a closed-circuit winding of the squirrel-cage induction type with low resistance, and in addition provide what may be termed a "polyphase" or distributed winding, namely, a winding similar to that usually found on the armature of any alternating or direct-current generator. This polyphase winding is connected to a commutator and has, at properly-spaced intervals, taps leading to slip rings.

In operation, at those times when but small torque is required, there is but little slip between the elements of the generator, thus generating low voltage of low frequency turning the motor rotor at a speed lower than that of the shaft, and the rotor "floats".

In starting, or at times when the torque requirement is high, there is a relatively large slip between the elements of the generator unit, generating thereby a relatively high voltage of greater frequency in the phase windings of the generator which increases the synchronous speed of the rotor, causing it, when the slip reaches a certain predetermined ratio relative to the speed of rotation of the shaft to tend to exceed in speed that of the shaft and to engage the shaft through the overrunning clutch and exert torque upon it.

Although the invention is described in conjunction with an automobile, it obviously may be employed in any system of transmission where it is found necessary or advantageous to change the torque conditions between a drive element and a driven element or elements when the drive element is run at either constant or variable speeds. For example, it may be used as a power transmission device for gasoline electric tram cars, rolling mills and other systems too numerous to mention.

Other features of the transmission system, such as the apparatus for reversing the car, will be disclosed in connection with the following description of an embodiment of the invention, and illustrated in the accompanying drawings, in which:—

Fig. 1 is a diagrammatic view of the chassis of an automobile having the transmission made in accordance with the invention disclosed herein.

Fig. 2 is a more detailed diagrammatic view of the generator and motor, showing the starting and excitation system;

Fig. 3 is a diagram of the generator windings;

Fig. 4 is a perspective view of an overrunning clutch, and

Fig. 5 is a detail illustrating the reversing gear.

Referring now to Fig. 1, the reference character 1 designates the frame of the chassis of an automobile, the usual internal-combustion engine being shown at 2 and the differential at 3. The drive shaft 4 of the automobile is connected through the reversing mechanism 5 with the differential 3. Operatively connected to either the crank shaft 6 of the engine or the drive shaft 4, preferably the crank shaft, is the field frame 7 which carries the fields 8 of the generator unit. The armature 9 of the generator unit is, in this instance, carried by the drive shaft 4. Secured to the frame of the chassis in this embodiment is the primary 10 of the second or motor unit, the secondary or rotor of which is shown at 11. The rotor is fastened to the shaft by means of the overrunning clutch 12, shown more in detail in Fig. 4, and to be later more particularly described. By means of the overrunning clutch the rotor 11 of the motor is adapted to rotate relatively to the shaft 4 in one direction only. A consant-voltage, variable-speed, direct-current auxiliary generator 13 is coupled to the main shaft 6 of the engine through a gearing 14. The voltage of the auxiliary generator 13 is controlled by any approved means, such as the third brush or differential series field system. Obviously the auxiliary generator could be connected to the engine by any other suitable means such as by a chain or belt drive, or it could be mounted directly on and concentric with the shaft 6.

Although I have shown the clutch or generator fields connected with the prime mover, and the armature connected with the driven element, they can, if desired, be interchanged, and the latter be mounted to be rotated by the shaft of the engine. The connections between the motor and generator and the starting and excitation systems are shown more clearly in Fig. 2, in which the reference character 15 indicates a hub for slip rings $a$, $b$ and $c$, and reference character 16 indicates a hub for slip rings $d$, $e$ and $f$.

The auxiliary or direct-current generator 13 is connected to the storage battery 17 through a suitable asymmetric battery control 18, as shown. The generator is in operation whenever the engine 2 is turning, as shown, and is adapted, at such times as its generated voltage is sufficient, to charge the battery 17, the latter being prevented at all times from discharging through the windings of the generator because of its connection through the battery control 18. One pole of the generator is connected by conductor $g$ to the slip ring $b$, and the other is connected through the variable resistance $h$ and contact $j$ to the slip ring $c$. The starting button indicated by the reference character 19 is arranged when operated to first move the contact $k$ out of engagement with the contact $j$ against the force of the spring $l$, and into engagement with the contact $m$, and upon further actuation forces $m$ into engagement with the contact $n$ against the force of the spring $o$, so that the contacts $k$, $m$ and $n$ are all operatively connected. The contact $k$ is connected to the slip ring $c$, the contact $n$ to the slip ring $a$, and the contact $m$ to one pole of the storage battery. The armature of the generator unit is wound as illustrated in the diagram shown in Fig. 3, in which $F_1$, $F_2$ designate the fields 8, and G represents the slotted core of the armature having in the outer portions of its slots the winding A, and in the inner portions the winding B.

The winding A is a polyphase or distributed winding similar to that usually found on the armature of any alternating or direct-current generator and is connected to a commutator 20, the same as in direct current practice, with taps C taken to the slip rings 22 as in the case of alternating-current machines. The combination of the commutator and slip rings connected to a winding of this character is similar to that found on the armature of a rotary converter. In addition to the winding A there is placed in the bottom of the slots another winding B consisting of bars of copper or other suitable material connected to solid end rings and forming a closed circuit winding of the squirrel-cage induction type. Winding A has comparatively high resistance and low reactance. Winding B, because of the fact that it is placed deeper in the iron than winding A, has comparatively high reactance, and because of its large section, low resistance. These windings function as follows:—

When the clutch is used for starting the prime mover, direct-current electricity is led into the commutator from the battery, thence to the winding A, operating the clutch as a direct-current motor to turn the engine over. In starting the car, the prime mover, being in operation, alternating electrical energy is generated in the winding A which is taken off through the slip rings 22 to the second or motor unit of the system, in which case the torque applied to the drive shaft is the sum of the torque applied by the clutch unit and that developed in the motor. Under these conditions winding B exerts comparatively low torque. As the speed of the driven shaft increases and the slip therefore decreases, the total torque exerted thereon decreases, the torque exerted by the winding A decreasing far more in proportion than does the total torque, while that exerted by the winding B, because the impedance of the winding B is decreased at reduced slip, increases so that at normal running practically all the torque is produced by the winding B. The brushes 21 for cooperation with the commutator 20 are mounted on the field member 7. The slip ring $a$ is connected to one brush member 21 and also to the generator field winding 8, to which is also connected the slip ring $c$. The slip rings $d$, $e$ and $f$ are each connected to the generator armature winding, and through the brushes 22 to the motor primary or stator windings 10. The motor is wound as an induction motor, in which the secondary winding may consist of two or more windings in the same slots having different resistances and reactances so as to produce two or more maximum speed torque points.

In operation, when the engine is running, the fields 8 of the generator unit are thereby rotated. Through means of the variable resistance $h$, the fields 8 of the generator unit are supplied with direct current from the generator 13, and by induction the armature of the generator unit is drawn around at a speed less than that of the generator field. The electrical energy developed by the relative rotation of the generator field and the generator armature will be comparatively strong or weak, and of high or low frequency, according to whether the slip between the field and the armature is large or small. The energy thus developed, in addition to causing rotation of the armature shaft, acts to drive the rotor 11 of the motor at its synchronous speed. When there is a great difference between the speed of the generator field and its armature, the frequency of alternation of the electrical energy and consequently the synchronous speed of the motor will be high, causing the rotor to be operated at such a speed that it will engage the shaft through the means of the overrunning clutch 12, and add its torque on the shaft to that produced by the generator. When the synchronous speed of the motor, due to a small slip between the field member and the armature member of the generator unit, is less than the speed of the shaft 4, the overrunning clutch 12 will slip and the rotor will merely "float" on the shaft 4, exerting no drag on the drive shaft. It is thus seen that at times when the load on the shaft 4 is greatest,—that is, when the car is being started, speed increased, or when it is going up hill,—the difference in speed between the generator field and its armature will be great, and at such times as large torque is necessary the motor will add the torque developed therein to that of the generator. When the car is running on the level at a constant speed, there will be comparatively little slip between the generator field and its armature, and the motor rotor will merely "float" on the shaft 4.

During the operation of the engine, the direct current generator 13 is arranged to charge the battery 17 through the battery control 18, as well as to supply excitation to the generator fields. The asymmetric property of the battery control makes it impossible for the battery to discharge through the direct-current generator.

To impart to the engine its initial movement, the shaft 4 is locked in any suitable manner; for instance, it may be locked by applying the emergency brake. The starting button 19 is then pressed downwardly, first breaking contact between $k$ and $j$, thus opening the direct-current generator circuit. As the starting button 19 is pressed farther, $k$ contacts with $m$, which puts the battery in circuit with the field windings 8 of the generator unit. By further pressure upon the starting button 19, $m$ is brought into contact with $n$. At the same time $k$ remains in contact with $n$. This brings the direct-current windings of the generator armature into the battery circuit through the brushes 21 and the commutator 20. The generator then acts as a motor to turn over the engine. When the device is functioning as a starter and not as a transmission, the circuit between the two units of the transmission is preferably opened as by the switch 49, Fig. 2. As soon as the engine is started the starting button 19 is released, breaking the contact between n, m and k, and closing the contact between k and j, thus throwing the auxiliary generator into the excitation circuit. Upon throwing out the resistance by means of the variable-resistance device h, the fields of the generator are excited.

The storage battery 17 is connected to the lighting and ignition system of the automobile in accordance with the practice used in cars of ordinary construction.

In Fig. 4 I have shown an example of one form of the overrunning clutch 12, by means of which the armature of the motor element is connected to the shaft at times when high torque is required. Upon the shaft 4 is securely fastened a boss 23 of hardened steel, and loosely mounted upon it and arranged to carry the rotor 11 is the hardened steel collar 24. One or more apertures or grooves 25 are cut in the inner face of the collar. These apertures have one side deeper than the other side so that the rollers 26 will clamp between the apertures and the boss 23 when the collar is moved in the direction indicated by the arrow s, and when the collar is revolved in the opposite direction, will release the collar from the boss because the rollers then will move into the larger space at the other side of the grooves. Thus it is seen that when the collar, and consequently the rotor 11, tends to revolve faster than the shaft in the direction indicated by the arrow s, the rotor will be securely locked or clamped to the shaft, but when the speed of the shaft is relatively greater than that of the rotor, the collar will slip and the rotor will float upon the boss of the shaft 4. In order to provide for the positive engagement of the collar with the boss when the armature tends to move faster than the shaft, a plunger 27 is provided, mounted in an aperture in the collar and pressed by means of a spring 29 and set-screw 30 into contact with each roller on the side opposite to the narrow side of the slot 25. By means of the set-screw 30 the tension upon the spring 29 is adjusted to more or less strongly force the roller to clamp the collar and boss together. Tapped apertures 31 are provided in opposite ends of the collar to which rings 28 are attached to each end of the collar, after assembling, in order to prevent the rollers 26 and plungers 27 from slipping out of their grooves. I have described this type of overrunning clutch merely as illustrative, for obviously an automatic cone clutch or a simple ratchet and pawl or other arrangement could be made to operate to produce substantially the same result.

In order to reverse the direction of the driven element I have shown in Fig. 1 a reversing gear 5 which may be constructed in accordance with the device illustrated in Fig. 5, in which 4 represents the driven shaft and 35 the rear end of the shaft, which may be directly connected to the differential 3, as shown in Fig. 1. Securely fastened to the shaft 35 is the dog clutch member 36, and slidingly mounted on shaft 4 is the clutch member 37 adapted to mesh with clutch member 36. Clutch member 37 is prevented from rotating relative to the shaft 4 by means of a feather key or other suitable device. By means of the lever 38 the clutch portion 39 of the member 37 is brought into or out of engagement with the clutch 36, thus locking or disconnecting the shaft 4 from the shaft 35. The gear 40 is cut in the member 37, and upon counter shaft 41, suitably mounted for rotation on the car frame, are fixed the gears 42 and 43. An internal gear 44 secured to the shaft 35 meshes with the gear 43. When the clutch member 39 is out of engagement with clutch 36, the gear 40 is enmeshed with the gear 42, and, as may be clearly seen, the rotation of the shaft 4 in one direction will cause rotation of the shaft 35 in the opposite direction. Upon shifting the lever 38 so that the clutch members interengage, the gear 40 is shifted out of mesh with the gear 42, and the shafts 8 and 35 are locked together by the clutch members 36 and 37.

Although the specific embodiment of the invention herein described relates to an automobile, it is obvious that it is not limited in its use to such application but is useful wherever it is desired to transmit power from a varying or constant-speeded drive element or prime mover to a driven element having varying speeds and varying torque requirements.

What I claim is:

1. In a transmission of the type described, a driving member, a driven member, elements of a dynamo-electrical machine carried by said members and cooperating to transmit torque from one member to the other, a dynamo-electric unit arranged to apply torque to said driven member only at such times as the speed of the rotor thereof assumes a predetermined relation to the speed of the driven member, an electrical connection between said dynamo-electric machine and said dynamo-electric unit whereby electrical energy generated by the relative rotation of the elements of the dynamo-electric machine is supplied to said dynamo-electric unit.

2. In a transmission of the type described, a driving member, a driven member, a dynamo-electric machine having one of its elements engaged with said driving member and the other with said driven member and cooperating to transmit torque from one member to the other, a motor arranged to apply torque to said driven member, electrical connections between said dynamo-electric machine and said motor whereby electrical energy generated by the relative rotation of the elements of the dynamo-electric machine is supplied to said motor, and means whereby the rotor of said motor is automatically disconnected from said driven member at such times as the motor is not aiding in the rotation of the driven member.

3. In a transmission of the type described, a driving member, a driven member, a dynamo-electric machine having one of its elements engaged with said driving member and the other with said driven member cooperating to transmit torque from one member to the other and arranged to supply alternating electric energy, an alternating-current motor arranged to apply torque to said driven member only at such times as the synchronous speed of the motor assumes a predetermined relation to the speed of the driven member, and electrical connections between said dynamo-electric machine and said motor whereby electrical energy is supplied from said machine to said motor.

4. In a transmission of the type described, a driving member, a driven member, a dynamo-electric machine having one of its elements engaged with said driving member and the other with said driven member cooperating to transmit torque from one member to the other and arranged to supply alternating electric energy, an alternating-current motor arranged to apply torque to said driven member, electrical connections whereby electrical energy is supplied from said dynamo-electric machine to said motor, and means for disconnecting the rotor of said motor from said driven member whenever the synchronous speed of said motor assumes a predetermined relation to the speed of the driven member.

5. In a transmission of the type described, a driving member, a driven member, a dynamo-electric unit having one element thereof connected to the driving member and the other to the driven member, a second dynamo-electric unit having one element stationary and the other element connected to the driven member, electrical connections between said dynamo-electric units, by means of which electrical energy developed in the first unit is supplied to said second unit, and means whereby the rotatable element of the second unit is automatically disconnected from said driven shaft whenever the electrical energy supplied by the first unit to the second unit is of such a character that the second unit is incapable of doing external work.

6. A transmission system comprising a drive element, a driven element, an alternating generator having both elements mounted for rotation, one of them being secured to the drive element and the other to the driven element, an alternating motor electrically connected to the generator, and means for automatically connecting the motor to the driven element when the synchronous speed of the motor exceeds that of the driven element.

7. In a transmission of the type described, a driving member, a driven member, a dynamo-electric unit having one element thereof connected to the driving member and the other element connected to the driven member, a second dynamo-electric unit having one element stationary and the other element connected to the driven member, electrical connections between said dynamo-electric units by means of which electrical energy developed in the first unit is supplied to the second unit, and means whereby the second unit is disconnected from the driven member whenever the speed of the latter assumes a predetermined relation with respect to the speed of the former.

8. In a transmission of the type described, a driving member, a driven member, a dynamo-electric machine having one of its elements engaged with said driving member and the other with said driven member and cooperating to transmit torque from one member to the other, a motor arranged to apply torque to said driven member, electrical connections between said dynamo-electric machine and said motor whereby electrical energy generated by the relative rotation of the elements of the dynamo-electric machine is supplied to said motor, and means whereby the rotor of said motor is disconnected from the driven member when the speed of the latter exceeds the speed of the former.

9. In an electric transmission system the combination of a drive member; a driven member; a generator having relatively rotatable field and armature elements, one of which is attached to the driven member; a motor having relatively movable field and armature elements, one of which is fixed and the other of which is connected to the rotor of the generator and rotatable therewith; mechanism driven by said motor; and electrical connections between the generator and the motor so arranged that the rotor of the motor is effective to apply torque to the driven mechanism only when the speed of the motor rotor tends to exceed the speed of the driven member.

JOHN ALLEN HEANY.